United States Patent

Finkelstein et al.

[11] Patent Number: 5,846,914
[45] Date of Patent: Dec. 8, 1998

[54] PROCESS AND FLUIDS FOR THE TREATMENT OF OIL WELLS

[75] Inventors: Nahum Phillip Finkelstein, Haifa; Stephen Harry Garnett, Nahariya; Samuel Wajc; John Metcalfe, both of Haifa, all of Israel

[73] Assignee: Bromine Compounds Limited, Beer-Sheva, Israel

[21] Appl. No.: 371,468

[22] Filed: Jan. 11, 1995

Related U.S. Application Data

[63] Continuation of Ser. No. 894,522, Jun. 5, 1992, abandoned.

[30] Foreign Application Priority Data

Jun. 7, 1991 [IL] Israel ........................................ 98414

[51] Int. Cl.⁶ ............................... C09K 7/00; C09K 3/00; E21B 21/00
[52] U.S. Cl. ......................... 507/209; 507/140; 507/213; 507/215; 507/269; 507/277; 507/925; 106/292; 106/305.1
[58] Field of Search ...................................... 507/140, 209, 507/213, 215, 269, 277, 925; 166/292, 305.1

[56] References Cited

U.S. PATENT DOCUMENTS

| | | |
|---|---|---|
| 3,246,692 | 4/1966 | Metler et al. . |
| 4,046,197 | 9/1977 | Gruesbeck et al. . |
| 4,186,803 | 2/1980 | Mondshine .............................. 166/292 |
| 4,369,843 | 1/1983 | Mondshine . |
| 4,822,500 | 4/1989 | Dobson et al. ......................... 507/212 |

OTHER PUBLICATIONS

Drilling and Drilling Fluids by Chilingarion (1983).

*Primary Examiner*—C. H.. Kelly
*Attorney, Agent, or Firm*—Michael N. Meller

[57] ABSTRACT

A process for the treatment of oil wells having a high content of "acid gases", comprises circulating through or pumping into the well a slurry comprising a water-soluble, solid salt and a saline solution, which slurry does not react with the "acid gases" and which has a density of more than 13 and preferably of at least 14 lb/gal.

12 Claims, No Drawings

PROCESS AND FLUIDS FOR THE TREATMENT OF OIL WELLS

This application is a continuation of application Ser. No. 07/894,522, filed Jun. 5, 1992 now abandoned.

FIELD OF THE INVENTION

Process and fluids for completion and workover of oil producing formations having a high content of associated $H_2S$ and/or $CO_2$. In particular, the fluids permit the control of the pressure of the formation and at the same time prevent or inhibit damage to the production formation during the completion or workover operations.

BACKGROUND OF THE INVENTION

A number of stages can be distinguished in the process of preparing oil and gas wells: drilling through the formations that overlie the hydrocarbon bearing formations, drilling through the hydrocarbon bearing formations, completion—a series of operations by which the hole through the hydrocarbon-bearing formations is prepared in such a manner as to ensure its stability and increase the rate at which the hydrocarbons can flow through it. In addition, a well that has been producing for a period and whose rate of production has declined may require workover, a series of procedures by which the permeability of the hydrocarbon-bearing formations is restored.

All these operations are carried out with the bore of the hole filled with a fluid. The primary reason for the presence of the fluid is to balance the pressure exerted by the formation through which the hole passes, and thereby prevent the ingress of gases and liquids which are frequently associated with such formations. Other purposes are to stabilize the walls of the hole, transport drill cuttings or solid debris to the surface, cool and lubricate downhole equipment, aid the suspension of tool strings and casing, and minimize damage to formation permeability among others.

The fluids that are used in drilling through the overlying formations commonly are comprised of a dense, highly insoluble solid, such as barite or magnetite, suspended in a liquid, most commonly water, although organic liquids sometimes are used. Various materials, clays, viscosifiers, etc., may be added to the slurry to give it the desired rheological and other properties. The same slurries, the so called muds, can also be used in drilling, completion and workover operations in the hydrocarbon-bearing formations, but it is recognized that the production rate of the well is substantially increased if clear solutions are used in said operations. In order to obtain the densities required to balance the formation pressures it is necessary to use highly soluble, dense salts in making these clear solutions, salts such as $CaCl_2$, NaBr, $CaBr_2$ and $ZnBr_2$. To the resulting brines soluble organic additives such as viscosifiers are added to give the desired rheological properties and to minimize loss of the fluid to the formations. Accordingly, preferred practice in the completion and workover stages uses these so called clear completion and workover brines.

An additional means of minimizing loss of fluid to the formations during the completion and workover stages involves the use of slurries of solid, soluble salts, such as NaCl, KCl and $CaBr_2$.

An exception is the case where the formations contain high concentrations of the so called "sour gases" $H_2S$ and $CO_2$. These react with the $Ca^{2+}$ and $Zn^{2+}$ of $CaBr_2$ and $ZnBr_2$, which are essential for the preparation of the most dense clear brines. The reaction gives rise to solids that are insoluble in the respective brine, e.g. ZnS, $ZnCO_3$, $CaCP_3$. This is unacceptable from two points of view: (a) there is a high probability that the solids will precipitate in and block the pores of the hydrocarbon-bearing formations; (b) the loss of the Zn and Ca content of the solution will reduce the density of the slurry and render it ineffective as a means of countering the pressure of the formation fluids.

U.S. Pat. No. 3,246,692 discloses the use of salts of orthophosphoric acid in high density aqueous solutions to impose high hydrostatic pressure within a well to prevent escape of high-pressure fluids.

WO 88/01010 reports the use of clear fluids containing monovalent metal bromides in aqueous $ZnBr_2$ solutions. It is stated that such solutions do not form precipitates in sour wells having high carbonate concentrations.

U.S. Pat. No. 4,046,197 discloses the use of fluids for well completion and workover, which contain finely divided particles of water-soluble salts suspended in saturated aqueous salt solutions. Salts of NaCl, $CaCl_2$, $CaBr_2$, $Ca(NO_3)_2$, $ZnCl_2$ and mixtures thereof are mentioned. The preferred fluid comprises a suspension of pulverized sodium chloride in saturated aqueous calcium chloride which can give a density as high as 14.0 lb/gal.

U.S. Pat. No. 4,369,843 discloses using for the aforesaid purposes a high density, non-damaging treating fluid, which comprises a saturated aqueous saline solution and at least one water-soluble salt which is substantially insoluble in the saturated saline solution. A particle size range of the water-soluble salt from about 5 microns to about 800 microns is specified. The salts which are described as forming the saturated aqueous saline solution and being the water-soluble salt are: potassium, sodium, and calcium chloride, sodium sulfate, carbonate and bicarbonate, calcium bromide and potassium carbonate. Fluids cited that do not contain calcium or zinc, have densities which do not exceed about 13 lb/gal. The treating fluid also includes a minor amount of a fluid loss additive which is substantially a thickening agent.

The technology described above provides answers to only part of the problems of production and exploration wells. The problem of sour gases has been treated above. In addition are the problems of the corrosivity of Ca and Zn halide solutions (which requires the use of expensive inhibitors), insufficient density for operating in deep wells, etc.

As a result there is no good solution for the fluids required for the completion and workover of sour wells having formation pressures requiring fluids of densities above 13 lb/gal. The only possibility within the prior art is to use conventional muds, e.g. those weighted with barite and magnetite, but these so damage the producing formations as to reduce the production rate to unacceptable levels. For this reason there are substantial reserves of oil and gas in different parts of the world that cannot be utilized.

SUMMARY OF THE INVENTION

The problems are solved, according to the invention, by the use of slurries comprising a solid soluble salt and a saline solution which slurries do not react with the $H_2S$ and $CO_2$ found in the wells, which have a density greater than 13 and preferably of at least 14 lb/gal. The slurries control the pressure, but do not damage the formations.

More specifically, according to the invention, slurries of solid alkali metal halide salts in brines of the same salt or some other salt in this family are used. The halides are chosen from among chlorides, bromides and iodides. The use of solid NaCl in NaCl brine is excluded from the invention. Of particular note are the use of solid NaBr in its own brine or in LiBr solution. Of course this does not mean that slurries of NaCl in a NaBr brine or KBr solid in its saturated solution or NaI solid in LiBr solution or other such combinations are to be excluded. It is obvious that when the solid is not identical with the dissolved salt then some of that solid will dissolve and saturate the solution.

Thus, it is found that:
in 89 g of 43.4% LiBr solution, 11 g of NaBr will dissolve;
in 96.4 g of 49.5% LiBr solution, 3.6 g of NaBr will dissolve;
in 98.0 g of 55.1% LiBr solution, 2.0 g of NaBr will dissolve; and
in 99.1 g of 57.7% LiBr solution, 0.9 g of NaBr will dissolve.

Accordingly, the solution phase of the slurries of NaBr in LiBr brines will contain respectively 11%, 3.6%, 2.0% and 0.9% of dissolved NaBr when the initial LiBr concentration is 43.4%, 49.5%, 56.1% and 57.7%, respectively.

It was surprising to discover that the maximum densities achievable with slurries of solid sodium bromide in sodium bromide solution do not increase smoothly with an increase in temperature. Thus, the maximum density slurry is found to be:
15.0 lb/gal at 40° C.;
15.2 lb/gal at 50° C.;
18.6 lb/gal at 51° C.; and
18.6 lb/gal at 60° C.

So in one particular form of the invention, slurries of NaBr solid in NaBr solutions are used above about 50° C. and preferably above 60° C.

It was surprising to discover that the maximum densities of achievable with slurries of solid sodium bromide in lithium bromide solution do not increase smoothly with an increase in lithium bromide concentration. Thus, the maximum density slurry is found to be:
14.2 lb/gal in 40% LiBr solution;
18.0 lb/gal in 45% LiBr solution; and
18.3 lb/gal in 50% LiBr solution.

So in another particular form of the invention, slurries of NaBr solid in LiBr solutions are used where the LiBr solution is 45% LiBr, but preferably 50% LiBr or greater.

It is possible that in some cases, some exchange of ions may occur in the system upon standing for extended periods of time. Thus, for example, to some extent bromide from the solution will become part of the solid in place of chloride or sodium from the solution will become part of the solid in place of potassium or lithium. In practice, these exchanges can be ignored, because they do not substantially alter the densities achievable or any other properties of the fluids.

When the slurry is composed of only one salt then the solution will be saturated and its concentration will depend on its temperature. When the water-soluble solid salt is not the same as the salt of the solution, e.g. the first is NaBr and the second is LiBr, then the solution is necessarily saturated with the former (i.e., NaBr), but may not be and preferably is not saturated with the latter (i.e., LiBr).

It is possible that some of the solids may deposit on the sides of the well bore in the region of the producing formations or within the pores of the producing formations. The first of these possibilities carries the advantage of reducing the loss of solution to the formation by bridging and sealing its face. Any salts so deposited are readily washed out by the connate water or by the introduction of "pills" of dilute aqueous solutions.

The particle size of the dispersed water-soluble salt is not critical and in general it is preferably between 5 and 2000 microns. However, the skilled practitioner will know how to use the finer particle range when required by the fluid cleaning equipment.

DETAILED DESCRIPTION OF PREFERRED EXAMPLES

The density of the slurries employed for completion and workover of oil wells, and therefore for carrying out this invention, depends, in a manner easily understood by persons skilled in the art, on the formation pressure that requires balancing. The mathematical relationship between said density, said pressure, the borehole temperature, and the depth of the well, is also known in the art.

The use of thickening agents in fluids of this kind is known in the art. Such agents may likewise be used in conjunction with the fluids according to this invention as well. Some such agents are xanthan gum, hydroxyethyl cellulose, guar gum and starch derivatives. Those skilled in the art will know how to select and use an appropriate thickening agent.

The system used for circulating the slurry throughout the well bore is essentially the same as is used in accepted practice when drilling muds or clear solutions are used. This consists of a reservoir and pumps above ground. The pumps draw fluid from the reservoir and pump it down the central pipe of the drill string to the bottom of the well from which it returns via the outer bore of the well casing. When it reaches the surface, it is piped to a screen for the removal of drilling debris, and then to the reservoir.

When the well fluid is a salt-in-brine slurry the reservoir will be a closed, insulated tank provided with a suitable stirrer and the surface piping will be insulated and provided with means for heating it. In addition, means will be provided for maintaining the slurry at the required working temperature, for instance by providing the reservoir tank with a suitable heat exchanger or electrical heating element. The surface piping will be so arranged that the slurry can be recirculated through the piping and the reservoir even when the circulation through the well is halted.

EXAMPLE 1

For a well 14,000 feet deep with a downhole temperature of 350° F. and a pressure of 12,300 PSI, a fluid with a density of 17.2 lb/gal is required. The gases dissolved in the hydrocarbons in the formation contain 2% $H_2S$ and 15% $CO_2$. A barrel of slurry of the appropriate density was obtained by mixing 340 lb of NaBr solid with 0.63 barrels of 12.7 lb/gal NaBr brine containing about 2 lb/bbl viscosifier. The mixture was maintained above 51° C. by heating the storage vessel. No sulfide or carbonate solids formed.

EXAMPLE 2

For a well 10,000 feet deep with a downhole temperature of 300° F. and a pressure of 7,400 PSI, a fluid with a density of 14.4 lb/gal is required. The gases dissolved in the hydrocarbons in the formation contain 10% $H_2S$ and 20% $CO_2$. A barrel of slurry of the appropriate density was obtained by mixing 230 lb of NaCl solid with 0.7 barrels of 12.7 lb/gal NaBr brine containing about 1 lb/bbl viscosifier. The mixture was maintained above 18° C. by heating the storage vessel. No evidence of reaction with the acid gases was found.

EXAMPLE 3

For a well 20,000 feet deep with a downhole temperature of 350° F. and a pressure of 19,700 PSI, a fluid with a density of 19.3 lb/gal is required. The gases dissolved in the hydrocarbons in the formation contain 21% $H_2S$ and 35% $CO_2$. A barrel of slurry of the appropriate density was obtained by mixing 387 lb of NaI solid with 0.70 barrels of 14.4 lb/gal LiBr brine containing about 3 lb/bbl viscosifier. The mixture was maintained above 20° C. by heating the storage vessel. No precipitation of sulfides or carbonates occurred.

Other examples of slurries according to the invention, that can be used in the process according to the invention, are the following, the compositions of which are defined by the amounts of the components required for making one barrel of slurry.

EXAMPLE 4

281 lb of NaBr 0.75 bbl of 50% LiBr solution 3 lb of viscosifier.

The slurry was maintained above 0° C. and has a density of 16.3 lb/gal.

EXAMPLE 5

384 lb of KI 0.65 bbl of KI brine (with a density of 14.3 lb/gal)

2 lb of viscosifier.

The slurry was maintained above 20° C. and has a density of 18.4 lb/gal.

EXAMPLE 6

782 lb of LiI 147 lb water 3 lb of viscosifier

The slurry was maintained above 80° C. and has a density of 22.1 lb/gal.

While some embodiments of the invention have been described by way of illustration, the invention may be carried into practice in a number of ways and with modifications, variations and adaptations, without departing from its spirit or exceeding the scope of the appended claims.

We claim:

1. A process for the treatment of oil wells containing $H_2S$ and/or $CO_2$, which comprises circulating through or pumping into the well a slurry comprising: a) one or more of a water-soluble, solid alkali metal halide salt wherein the halide is independently selected from the group consisting of chloride, bromide and iodide, and the alkali metal is independently selected from the group consisting of Na, K, and Li; b) an aqueous solution of one or more of the aforesaid salts; and c) viscosifier; which slurry has a density of at least 14 lb/gal; with the proviso that the slurry is not a mixture of solid NaCl and a solution of NaCl.

2. Process according to claim 1, wherein the solid salt is NaBr and the solution is an aqueous NaBr solution or an LiBr solution saturated with NaBr.

3. A process according to claim 1, wherein a slurry of solid NaBr in NaBr solution is at temperatures above about 50° C.

4. A process according to claim 1, wherein a slurry of NaBr in LiBr solution is at temperatures of 0° C. or above.

5. A process according to claim 1, wherein the aqueous solution of one or more alkali metal salts is saturated at least with the water-soluble salt used as the solid.

6. A process according to claim 4, wherein the saline solution is saturated with NaBr but not with LiBr.

7. A process according to claim 2, wherein the solution is an aqueous LiBr solution in which the concentration of LiBr is at least 45%.

8. A process according to claim 3 wherein the temperature is about 60° C.

9. A process according to claim 7, wherein the concentration of LiBr is greater than 50%.

10. Slurry for the treatment of oil wells, comprising a) a water-soluble, solid salt which is an alkali metal halide, wherein the halide is selected from the group consisting of chloride, bromide and iodide, and the alkali metal is selected from the group consisting of Na, K and Li;, b) an aqueous solution of one or more of aforesaid salts, and c) a viscosifier; with the proviso that if said solid salt is NaCl, then the aqueous solution is not a solution in which the salt of the highest concentration is NaCl.

11. A slurry according to claim 10, comprising solid NaBr and a solution of salt or salts selected from the group consisting of NaBr and LiBr.

12. A slurry according to claim 10, wherein the aqueous solution is saturated with the water-soluble salt.

\* \* \* \* \*